United States Patent Office 3,213,018
Patented Oct. 19, 1965

3,213,018
METHOD OF INHIBITING DEPOSITION OF
SODIUM CHLORIDE
Charles T. Roland and Paul H. Ralston, Bethel Park, Pa.,
assignors to Calgon Corporation, a corporation of
Pennsylvania
No Drawing. Filed Nov. 23, 1962, Ser. No. 239,804
12 Claims. (Cl. 252—8.55)

This invention relates to inhibiting formation of solid sodium chloride in saturated solutions thereof in an environment of declining temperature and during subsequent storage at reduced temperatures.

The solid sodium chloride normally formed may be dispersed throughout the solution or may accumulate as a scale on surfaces contacting the salt solutions. Deposition as a scale is particularly objectionable when the salt solution is being transported through a conduit. Our invention is applicable wherever concentrated solutions or brines containing sodium chloride are used in environments subject to reductions in temperature and subsequent storage.

Concentrated and saturated brines are often conveyed through pipes and other conduits in an envirnonment of declining temperature. For example, cooling and refrigerating systems amy use concentrated brines under conditions of changing temperature.

Also, concentrated solutions of sodium chloride are removed from underground deposits by dissolving in situ and pumping the resultant concentrated solution to the surface. Often such brines, at an elevated temperature, are piped for miles from the brine well to the point of use for chlorine porduction, etc. During the tarsnportation period, temperatures will be reduced and sodium chloride will deposit from the strong salt solutions.

Brine also occurs in or near many underground petroleum sources and is mixed with the petroleum in large quantities and produced up the well with the natural petroleum. Mixtures of petroleum and brine are particularly troublesome from the standpoint of salt deposition in the well tubing since the brines are at elevated temperatures and highly concentrated or saturated at the producing zone, and experience a considerable temperature drop in the course of rising to the surface. The sodium chloride which tends to deposit under these conditions may foul or completely plug the producing equipment, thus stopping the flow of well fluids including petroleum.

We have discovered that the addition of a small amount of a compound producing in solution a complex anion of the formula $MX_n$, where M is iron or cobalt, X is (CN), $(NO_2)$, (NO), or $(C_2O_4)$ and $n$ is 6, or, in the case of the oxalate radical 3, will very effectively inhibit the loss of sodium chloride from saturated and highly concentrated solutions thereof undergoing a reduction of temperature and subsequent storage at reduced temperatures. Our invention thereby permits the preparation of so-called supersaturated solutions of sodium chloride at reduced temperatures. It is also applicable to solutions of sodium chloride mixed with other salts.

Several demonstrations of our invention have been made. The results of these are presented in the following Tables I–III. For Tables I and II, sodium chloride solutions were made by adding 27.5 g. sodium chloride to 72.5 g. distilled water and boiling in a flask equipped with a reflux condenser until the salt was taken completely into solution at atmospheric boiling temperature. The salt-water composition thus prepared contains sufficient salt to give a saturated solution at 80° C. and will deposit sodium chloride as the temperature of the solution is reduced below that point. When a small amount of our inhibitor was added (or, in some cases had already been added to the dissolving water before heating) and the saturated solution was permitted to air cool from the boil to room temperature (25° C.) in a stoppered flask, sodium chloride deposition was markedly or completely inhibited.

An untreated brine prepared as above and allowed to air cool to room temperature will start to precipitate sodium chloride in a few minutes and will have deposited all of the sodium chloride possible at that temperature after several hours. Reduction to room temperature is virtually complete after about one hour.

The results of this test are shown in terms of pecent inhibition of the loss of sodium chloride from solution. This percent inhibition was determined by analyzing for the chloride in the supersaturated brine or weighing the sodium chloride deposition or a combination of both methods.

A comparison of the chloride concentration of the treated brine (room temperature) with the chloride content of an untreated brime (room temperature) permitted the calculation of percent inhibition of sodium chloride crystallization. The uninhibited brine concentration was assigned the value of 0% inhibition while the total chloride content originally present at the elevated temperature was taken as 100% inhibition.

The percent inhibition was also measured by removing the solid deposit from the brine, drying and weighing it. This result was compared with the weight of salt deposited by an uninhibited solution (zero percent inhibition) and the absence of salt deposition during complete stabilization (100 percent inhibition). Most of the results in the tables are averages of the results obtained by the above-mentioned test methods of salt inhibition.

Table I shows the inhibitive power against salt deposition, crystallization, and other loss from solution using several concentrations of several inhibitors. The data were taken at the end of 24 hours after brine saturation prepared at boil. Reduction to room temperature was virtually complete about one hour after boil. Our invention is effective, however, for longer and shorter cooling periods. Concentrations of inhibitor are expressed as parts per million parts by weight of saturated brine.

In Table II, we have tabulated data indicating the stability of several of our prefered compositions. It is evident that application of these inhibitors can markedly reduce or completely inhibit for several weeks the deposition of sodium chloride from concentrated or saturated brines subjected to temperature reduction. Brines were prepared in the same manner as for Table I.

TABLE I

| Inhibitor | P.p.m. | Percent inhibition of sodium chloride deposition, 24 hours room temperature storage, 25° C. |
|---|---|---|
| $K_3Fe(CN)_6$ | 0 | 0 |
| $K_3Fe(CN)_6$ | 25 | <10 |
| $K_3Fe(CN)_6$ | 50 | 25 |
| $K_3Fe(CN)_6$ | 100 | 55 |
| $K_3Fe(CN)_6$ | 200 | 60 |
| $K_3Fe(CN)_6$ | 400 | 90 |
| $K_4Fe(CN)_6 \cdot 3H_2O$ | 0 | 0 |
| $K_4Fe(CN)_6 \cdot 3H_2O$ | 10 | 63 |
| $K_4Fe(CN)_6 \cdot 3H_2O$ | 25 | 79 |
| $K_4Fe(CN)_6 \cdot 3H_2O$ | 50 | 100 |
| $K_4Fe(CN)_6 \cdot 3H_2O$ | 75 | 100 |
| $K_4Fe(CN)_6 \cdot 3H_2O$ | 100 | 100 |
| $Na_3Fe(C_2O_4)_3$ | 100 | 10 |
| $Na_3Fe(C_2O_4)_3$ | 300 | 10 |
| $(NH_4)_3Fe(C_2O_4)_3$ | 100 | 10 |
| $(NH_4)_3Fe(C_2O_4)_3$ | 300 | 10 |
| $Na_3Co(NO_2)_6$ | 100 | 30 |
| $Na_4Fe(CN)_6 \cdot 10H_2O$ | 10 | 35 |
| $Na_4Fe(CN)_6 \cdot 10H_2O$ | 25 | 50 |
| $Na_4Fe(CN)_6 \cdot 10H_2O$ | 50 | 67 |
| $Na_4Fe(CN)_6 \cdot 10H_2O$ | 75 | >95 |
| $Na_4Fe(CN)_6 \cdot 10H_2O$ | 100 | 100 |
| $Na_4Fe(CN)_6 \cdot 10H_2O$ | 200 | 100 |
| $Na_4Fe(CN)_6 \cdot RNH_3$* | 100 | 26 |
| $Na_2Fe(CN)_5NO \cdot 2H_2O$ | 100 | 13 |
| $Fe_4[Fe(CN)_6]_3$ | 100 | 23 |

*Where R is mixed n-alkyl ($C_8$–$C_{18}$).

Table II

| Inhibitor | P.p.m. | Percent inhibition of sodium chloride deposition, room temperature storage, 25° C. | | | |
|---|---|---|---|---|---|
| | | 1 day | 3 days | 11 days | 12 days |
| $Na_4Fe(CN)_6 \cdot 10H_2O$ | 0 | 0 | | | |
| $Na_4Fe(CN)_6 \cdot 10H_2O$ | 10 | 35 | | | |
| $Na_4Fe(CN)_6 \cdot 10H_2O$ | 25 | 50 | | | |
| $Na_4Fe(CN)_6 \cdot 10H_2O$ | 50 | 67 | | | |
| $Na_4Fe(CN)_6 \cdot 10H_2O$ | 75 | >95 | 70 | | |
| $Na_4Fe(CN)_6 \cdot 10H_2O$ | 100 | 100 | >85 | | 75 |
| $Na_4Fe(CN)_6 \cdot 10H_2O$ | 200 | 100 | 100 | | 100 |
| $K_4Fe(CN)_6 \cdot 3H_2O$ | 10 | 63 | | | |
| $K_4Fe(CN)_6 \cdot 3H_2O$ | 25 | 79 | | | |
| $K_4Fe(CN)_6 \cdot 3H_2O$ | 50 | 100 | | 88 | |
| $K_4Fe(CN)_6 \cdot 3H_2O$ | 75 | 100 | | 92 | |
| $K_4Fe(CN)_6 \cdot 3H_2O$ | 100 | 100 | | 100 | |

Any of the above inhibitors may be added to the brine in solid or liquid form. However, these additives should be present in solution at a time and temperature before the sodium chloride starts to deposit or crystallize from the concentrated solution.

Furthermore, we have discovered that the previously described additives inhibit the deposition of sodium chloride when solutions are saturated at elevated temperatures with combinations of sodium chloride and other alkali and alkaline earth metal chlorides, and the temperatures are subsequently reduced. We have used the same saturation techniques and evaluation procedures as previously described for sodium chloride and have observed the inhibitive data shown in Table III. The brines in Table IIIA were prepared by dissolving 24.4 g. NaCl and 3.2 g. $CaCl_2$ in 72.4 g. water. Those in Table IIIB were prepared by dissolving 20.2 g. NaCl and 7.4 g. $CaCl_2$ in 72.4 g. water. In each case the weights of the salts are computed as the anhydrous salt. The mixture was brought to a boil as previously explained to dissolve all the salts present.

Table IIIA

| Inhibitor | P.p.m. | Percent inhibition of sodium chloride deposition, 24 hours room temperature storage |
|---|---|---|
| | 0 | 0 |
| $K_4Fe(CN)_6 \cdot 3H_2O$ | 50 | 100 |
| $K_4Fe(CN)_6 \cdot 3H_2O$ | 100 | 100 |
| $K_4Fe(CN)_6 \cdot 3H_2O$ | 200 | 100 |
| $Na_4Fe(CN)_6 \cdot 10H_2O$ | 50 | 72 |
| $Na_4Fe(CN)_6 \cdot 10H_2O$ | 100 | 92 |
| $Na_4Fe(CN)_6 \cdot 10H_2O$ | 200 | 100 |

Table IIIB

| Inhibitor | P.p.m. | Percent inhibition of sodium chloride deposition, 24 hours room temperature storage |
|---|---|---|
| | 0 | 0 |
| $K_4Fe(CN)_6 \cdot 3H_2O$ | 100 | 100 |
| $K_4Fe(CN)_6 \cdot 3H_2O$ | 200 | 100 |
| $Na_4Fe(CN)_6 \cdot 10H_2O$ | 100 | 100 |
| $Na_4Fe(CN)_6 \cdot 10H_2O$ | 200 | 100 |

A field trial in a pumping oil well in the Rocky Mountain area using a continuous feed of solutions of sodium ferrocyanide providing an average of about 150–200 p.p.m. (based on brine), extended the operating time before cleaning of the tubing was necessary from three weeks to six weeks. That is, in normal operation, the tubing had previously become clogged to the extent that it had to be pulled and cleaned about every three weeks. Our invention inhibited the deposition of sodium chloride effectively to permit continuous production for six weeks.

We do not intend to be limited to the specific examples recited. Our invention may be otherwise variously practiced within the scope of the following claims.

We claim:

1. Method of inhibiting the deposition on oil well tubing and equipment of sodium chloride from highly concentrated oil field brines during flow upwards through a wellbore, in which there is a significant temperature drop normally causing such deposition, comprising adding to the brine in the well at a depth below that at which such salt deposition normally occurs an amount of a complex anion of the formula $MX_6$ sufficient to inhibit sodium chloride deposition on said tubing and equipment, where M is selected from the group consisting of iron and cobalt, and X is selected from the group consisting of (CN), ($NO_2$), and (NO).

2. Method of claim 1 in which said complex anion is derived from ferric ferrocyanide.

3. Method of inhibiting the deposition on oil well tubing and equipment of sodium chloride from highly concentrated oil field brines during flow upwards through a wellbore, in which there is a significant temperature drop normally causing such deposition, comprising adding to the brine in the well at a depth below that at which such salt deposition normally occurs an amount of a complex iron oxalate anion sufficient to inhibit sodium chloride deposition on said tubing and equipment.

4. Method of inhibiting the deposition on oil well tubing and equipment of sodium chloride from highly concentrated oil field brines during flow upwards through a wellbore, in which there is significant temperature drop normally causing such deposition, comprising adding to the brine in the well at a depth below that at which such salt deposition normally occurs an amount of alkali metal ferrocyanide sufficient to inhibit sodium chloride deposition on said tubing and equipment.

5. The method of claim 4 in which the alkali metal ferrocyanide is added in combination with an aliphatic amine of the formula $RNH_2$ where R is an n-alkyl group of 8 to 18 carbon atoms, in a mol ratio of alkali metal ferrocyanide to aliphatic amine of about 1 to 1.

6. Method of claim 4 in which the alkali metal ferrocyanide is sodium ferrocyanide.

7. Method of claim 4 in which the alkali metal ferrocyanide is potassium ferrocyanide.

8. Method of inhibiting the deposition on oil well tubing and equipment of sodium chloride from highly concentrated oil field brines during flow upwards through a wellbore, in which there is a significant temperature drop normally causing such deposition, comprising adding to the brine in the well at a depth below that at which such salt deposition normally occurs an amount of alkali metal cobalt nitrite sufficient to inhibit sodium chloride deposition on said tubing and equipment.

9. Method of inhibiting the deposition on oil well tubing and equipment of sodium chloride from highly concentrated oil field brines during flow upwards through a wellbore, in which there is a significant temperature drop normally causing such deposition, comprising adding to the brine in the well at a depth below that at which such salt deposition normally occurs an amount of a compound selected from the group consisting of alkali metal and ammonium ferro-oxalates sufficient to inhibit sodium chloride deposition on said tubing and equipment.

10. Method of inhibiting the deposition on oil well tubing and equipment of sodium chloride from highly concentrated oil field brines during flow upwards through a wellbore, in which there is a significant temperature drop normally causing such deposition, comprising adding to the brine in the well at a depth below that at which such salt deposition normally occurs an amount of the compound $Na_2Fe(CN)_5NO \cdot 2H_2O$ sufficient to inhibit sodium chloride deposition on said tubing and equipment.

11. Method of inhibiting the deposition of sodium chloride from concentrated sodium chloride brine onto pipes during transportation through said pipes from an underground brine well to a point of use for said brine, which deposition is normally caused by reductions in temperature of said brine, comprising adding to said brine prior to reduction in temperature an amount of a complex anion of the formula $MX_6$ sufficient to inhibit sodium chloride deposition onto said pipes, where M is selected from the group constiting of iron and cobalt, and X is selected from the group consisting of (CN), (NO$_2$), and (NO).

12. Method of inhibiting the deposition of sodium chloride from concentrated sodium chloride brine onto pipes during transportation through said pipes from an underground brine well to a point of use for said brine, which deposition is normally caused by reductions in temperature of said brine, comprising adding to said brine prior to reduction in temperature an amonut of a complex anion of the formula $M(C_2O_4)_3$ sufficient to inhibit sodium chloride deposition onto said pipes, where M is selected from the group consisting of iron and cobalt.

References Cited by the Examiner

UNITED STATES PATENTS

| | | | |
|---|---|---|---|
| 2,429,593 | 10/47 | Case | 252—8.55 |
| 2,642,335 | 6/53 | May et al. | 23—303 |
| 3,127,932 | 4/64 | Schremp et al. | 252—8.55 |

FOREIGN PATENTS

| | | |
|---|---|---|
| 848,328 | 9/60 | Great Britain. |

OTHER REFERENCES

Mullin: Crystallization, published by Butterworth & Co. of London, 1961, page 101.

JULIUS GREENWALD, *Primary Examiner.*